(12) United States Patent
Jung

(10) Patent No.: US 7,003,334 B2
(45) Date of Patent: Feb. 21, 2006

(54) AUTO-FOLDER TYPE CELLULAR PHONE WITH VARIABLE OPENING AND CLOSING VELOCITY

(75) Inventor: Sung Tai Jung, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 468 days.

(21) Appl. No.: 10/406,727

(22) Filed: Apr. 2, 2003

(65) Prior Publication Data

US 2004/0038718 A1   Feb. 26, 2004

(30) Foreign Application Priority Data

Aug. 22, 2002   (KR)   ...................... 10-2002-0049806

(51) Int. Cl.
*H04B 1/38*   (2006.01)
(52) U.S. Cl. .............................. 455/575.3; 379/433.13; 455/575.1
(58) Field of Classification Search ............ 455/575.3, 455/572, 575.1; 379/433.13, 433, 434, 324, 379/326, 325
See application file for complete search history.

(56) References Cited

U.S. PATENT DOCUMENTS

| 5,923,751 A   * | 7/1999 | Ohtsuka et al. ......... 379/433.13 |
| 6,374,089 B1 * | 4/2002 | Till ............................ 455/90.1 |
| 6,628,974 B1 * | 9/2003 | Lim ......................... 455/575.3 |
| 6,751,488 B1 * | 6/2004 | Lee .......................... 455/575.3 |
| 6,885,849 B1 * | 4/2005 | Kim et al. .................. 455/90.3 |

FOREIGN PATENT DOCUMENTS

EP          1075125 A2 *   2/2001

* cited by examiner

*Primary Examiner*—Edward Urban
*Assistant Examiner*—Richard Chan
(74) *Attorney, Agent, or Firm*—Darby & Darby

(57) ABSTRACT

Disclosed is an auto-folder type cellular phone capable of opening and closing the folder automatically. Particularly, the present invention relates to an auto-folder type cellular phone with a variable opening and closing velocity, which enables a user to vary a driving voltage of the cellular phone whenever desired, whereby the user, unlike a conventional auto-folder type cellular phone having a fixed (or constant) driving voltage, now can open or close the cellular phone more quickly or slowly anyway he/she wants.

4 Claims, 6 Drawing Sheets

| Folder Direction | | F8 Module | | | F9 Module | | | |
|---|---|---|---|---|---|---|---|---|
| | | 2.7V | 3.0V | 3.3V | 2.7V | 3.0V | 3.3V | |
| Open | Is(mA) | 206 | 230 | 251 | 229 | 252 | 280 | |
| | Ir(mA0 | 94 | 85 | 80 | 124 | 104 | 102 | |
| | T(sec) | 0.968 | 0.812 | 0.724 | 1.008 | 0.848 | 0.736 | |
| | RPM(ave) | 31 | 37 | 41 | 30 | 35 | 41 | |
| Close | Is(mA) | 215 | 239 | 265 | 220 | 250 | 274 | |
| | Ir(mA0 | 55 | 57 | 58 | 73 | 63 | 73 | |
| | T(sec) | 0.878 | 0.77 | 0.694 | 0.888 | 0.766 | 0.67 | |
| | RPM(ave) | 34 | 39 | 43 | 34 | 39 | 45 | |

FIG. 7

AUTO-FOLDER TYPE CELLULAR PHONE WITH VARIABLE OPENING AND CLOSING VELOCITY

BACKGROUND OF THE INVENTION

1. Field of the Invention

The present invention relates to an auto-folder type cellular phone whose folder cover opens or closes automatically. More specifically, the present invention relates to an auto-folder type cellular phone with a variable opening and closing velocity, which enables a user to vary a driving voltage of his/her cellular phone whenever desired, whereby the user, unlike a conventional auto-folder type cellular phone having a fixed (or constant) driving voltage, now can open or close his/her cellular phone more quickly or slowly anyway he/she wants.

2. Description of the Related Art

In general, a cellular phone (or mobile phone) indicates a terminal for providing subscribers of cell phones with mobile communication services available in a designated coverage within a service area by changing part of subscriber's locally dedicated line to a radio network. While a conventional communication service allows a subscriber to make a call in a rooted, stationary place using a given line number, the cellular phone enables the mobile subscriber to make a phone call using his/her logical personal number any place he/she wants.

For easiness and convenience of use, the cellular phone has been in great demand. To keep abreast with such tendency, the mobile phone industry has been trying to develop a smaller and multi-functioned mobile phone to meet diverse demands of consumers.

Typically, the cellular phone can be divided into several groups in accordance with its shape and whether number buttons (or functional menu buttons) are exposed to the outside: bar type cellular phone, flip type cellular phone whose number (functional menu) buttons are covered by a cover, and a folder type cellular phone whose body is folded in half. As more people prefer a smaller sized cell phone, the folder type mobile phone has been more popularized than the other types.

For all that, the conventional folder type cellular phone gives another problem to subscribers that its relatively heavy folder requires its subscriber to use his/her both hands to open up the handset, that is, one hand for holding the main body of the phone and the other hand for opening/closing the handset.

Several approaches have been developed to deal with this problem. One such approach involves the use of a driving device (or drive) to open/close the handset automatically.

FIG. 1 is a perspective view of an auto-folder type cellular phone. As depicted in the drawing, the cellular phone 201 includes a main body 202 and a folder 203. The main body 202 is typically mounted with number (functional menu) buttons 204, a microphone 205, many kinds of built-in components for incoming/outgoing calls, and a battery pack 206 for power supply.

The folder 203 includes a display 207 for displaying every kind of call information and functional menu information available in the phone, a speaker 208, and other necessary built-in components.

Generally, the folder 203 of the folder type cellular phone 201 is connected to the main body 202, being supported by a hinge means. Thanks to the hinge, the folder 203 folds (closes) or opens, moving forward or backward. To automate this move, there is a switch (i.e. opening/closing button) on the upper right corner of the main body in the form of a signal applying unit 209.

As illustrated in FIG. 2, a subscriber can easily open up or close the folder with one hand by operating the signal applying unit 209. The most important thing to consider before designing such cellular phone is that the folder should be opened or closed not only in an automatic mode but also manual mode in case of an unexpected situation.

FIG. 3 is a cross-sectional view of the conventional auto-folder type cellular phone, representing a state that a revolving unit 211 and a fixating unit 210 positioned at one side of the main body are joined together, wherein the revolving 211 includes a power generating means for automatically opening and closing the folder in response to a signal from the signal applying unit and a power transfer means.

FIG. 4 is a cross-sectional view of the revolving unit 211 and the fixating unit 210, the fixating unit 210 being placed on both sides of the main body, and the revolving unit 211 being installed between the fixating units 210 in the form of a module housing. Especially, the drawing captures an essential part of the cellular phone in that a driving device for automatically opening and closing the folder is installed inside the revolving unit 211.

As shown in FIG. 4, the conventional auto-folder type cellular phone includes the fixating unit 210 on both sides of the main body; the revolving unit 211 connected to one side of the folder 203, the folder 203 being supported by the fixating unit to be revolvable; a motor 212 operating as a power generating means attached inside of the revolving unit and working with the signal applying unit that is controlled (or operated) by a user; a reduction gear 213 linked to an output end of the motor 212 for decelerating a revolving rate and at the same time, preventing reversion; a first coupler 215, capable of revolving, linked to the reduction gear 213; a second coupler 216, capable of sliding, mounted on the fixating unit; and an elastic means 217 for providing an elastic force, that is mounted inside the revolving unit. Also, an end portion of the first coupler 215 and an end portion of the second coupler 216 are selectively geared with each other.

Therefore, when a subscriber of the auto-folder type cellular phone operates the signal applying unit 209 to open up the folder 203, the folder first revolves within a predetermined time having the first coupler 215 and the second coupler 216 as a fixed point, halts, and then opens. If the subscriber wants to shut the folder 203, all he or she needs to do is operate the signal applying unit 209 again. In such case, the motor is driven to an opposite direction for a predetermined period of time so as to shut the folder. On the other hand, if the cellular phone is in a manual mode, there is created a slip between the first coupler 215 and the second coupler 216, so when the folder reaches a certain position, it is opened and closed by the elastic force.

Despite several merits found in the auto-folder type cellular phone, a problem still arises in that subscribers of the conventional auto-folder type cellular phones cannot necessarily control the opening/closing velocity of the folder since the driving voltage thereof is set to be constant. Hence, when the subscribers want to vary (i.e. speed up or slow down) the opening/closing velocity of the folder, the conventional auto-folder type cellular phone could not satisfy their demand.

SUMMARY OF THE INVENTION

It is, therefore, an object of the present invention to provide an auto-folder type cellular phone with a variable opening and closing velocity, capable of varying the opening and closing velocity any time at a subscriber's demand, by enabling the subscriber to vary a driving voltage whenever the subscriber wishes to speed up or slow down the opening and closing velocity of the folder, thereby satisfying the subscriber's demand and releasing discontent with a conventional auto-folder type cellular phone having a fixed driving voltage.

To achieve the above object, there is provided an auto-folder type cellular phone with a variable opening and closing velocity, which includes: a main body with a pair of hinge shafts at one side, two hinge shafts being opened to face each other at a predetermined distance; a folder disposed between the pair of hinge shafts, having a cylindrical housing whose both sides are opened; a first coupler and a second coupler for adjusting a position for the folder to be opened and a position for the folder to be closed; an elastic member for providing an elastic force to make the first coupler and the second coupler coupled closely to each other; a fixed resistance with a predetermined resistance value for receiving a battery voltage supplied from a battery; a plurality of voltage-dividing resistances for dividing the battery voltage given that the voltage-dividing resistances are connected to the fixed resistance; a sliding switch for connecting the voltage-dividing resistances respectively to the fixed resistance in series by making a sliding motion; and a motor driving unit for opening and closing the folder centering around the hinge shafts by varying a direction of a divided voltage of the battery voltage taken in the motor, wherein the divided voltage varies responsive to the sliding switch at an operation signal given by a subscriber of the auto-folder type cellular phone.

Preferably, the plurality of voltage-dividing resistances in the auto-folder type cellular phone with a variable opening and closing velocity includes a first resistance for maintaining a low opening and closing velocity for the folder; a second resistance for maintaining a high opening and closing velocity of the folder high; and a third resistance for maintaining a normal opening and closing velocity of the folder.

According to another aspect of the invention, the plurality of voltage-dividing resistances in the auto-folder type cellular phone with a variable opening and closing velocity includes a first resistance for maintaining a low opening and closing velocity for the folder has a value of 27/20 of the fixed resistance.

Based on still another aspect of the invention, the plurality of voltage-dividing resistances in the auto-folder type cellular phone with a variable opening and closing velocity includes a first resistance for maintaining a high opening and closing velocity for the folder has a value of 33/20 of the fixed resistance.

BRIEF DESCRIPTION OF THE DRAWINGS

The above objects, features and advantages of the present invention will become more apparent from the following detailed description when taken in conjunction with the accompanying drawings, in which:

FIG. 7 diagrammatically exemplifies an actual measurement result of the present invention.

DETAILED DESCRIPTION OF THE PREFERRED EMBODIMENT

Figure 1:
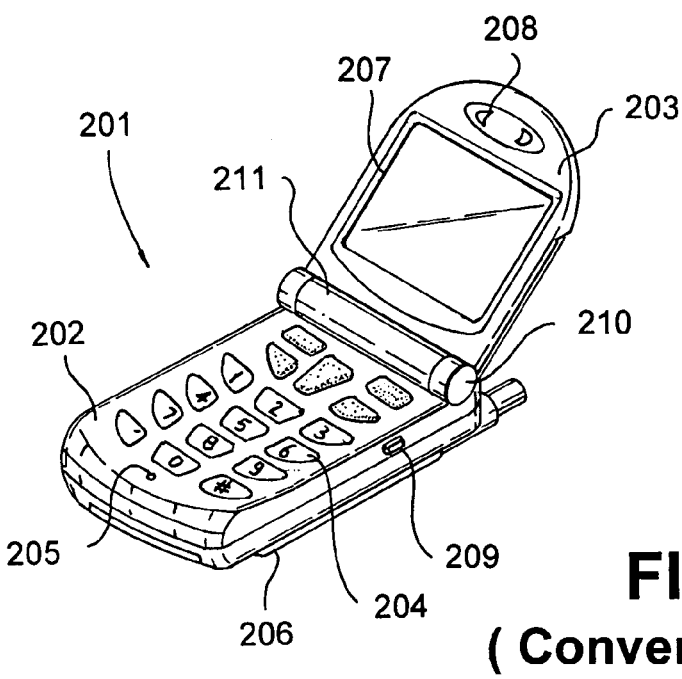
FIG. 1 is a perspective view illustrating an auto-folder type cellular phone according to a related art.
Figure 2:
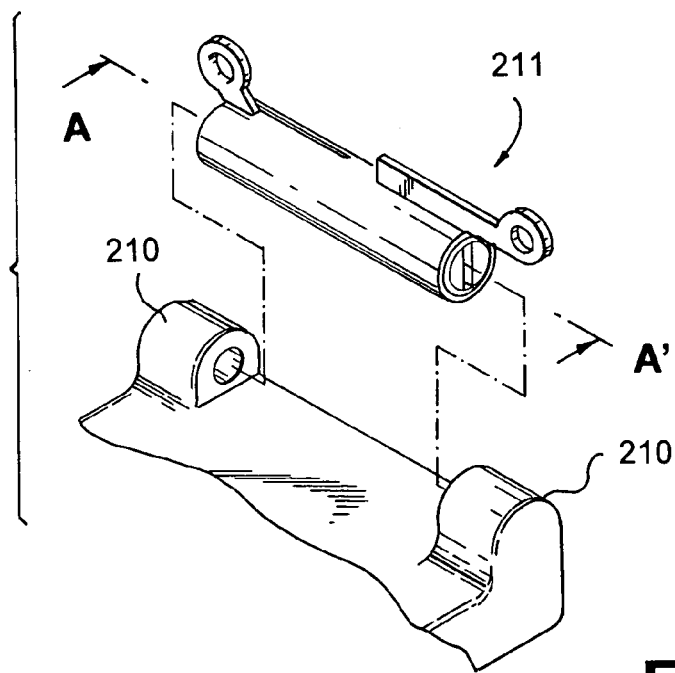
FIG. 2 is a perspective view illustrating a state that a revolving unit and a fixating unit of the auto-folder type cellular phone in the related art are coupled to each other.
Figure 3:
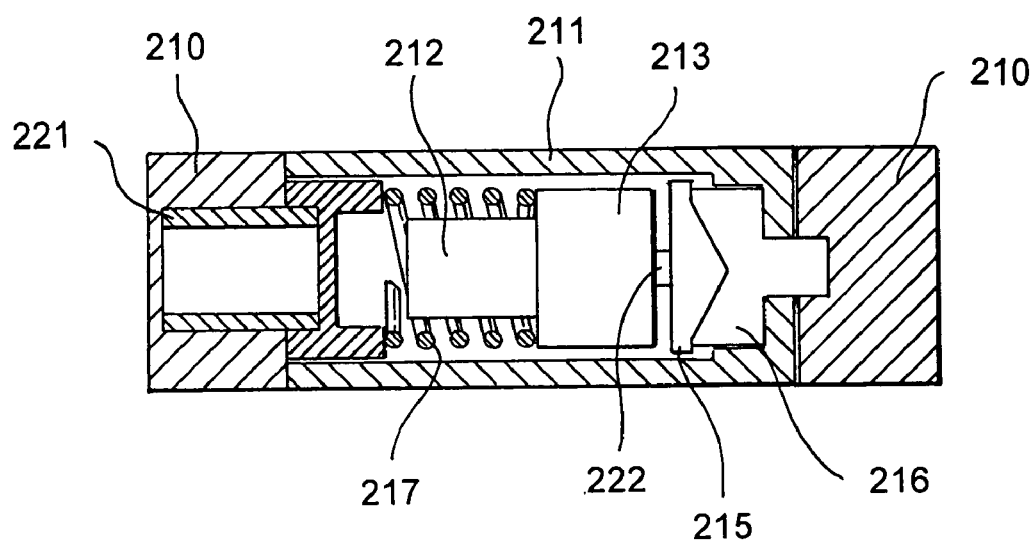
FIGS. 3 and 4 are cross-sectional views illustrating the revolving unit and the fixating unit, respectively, of the auto-folder type cellular phone in the related art.
Figure 4:
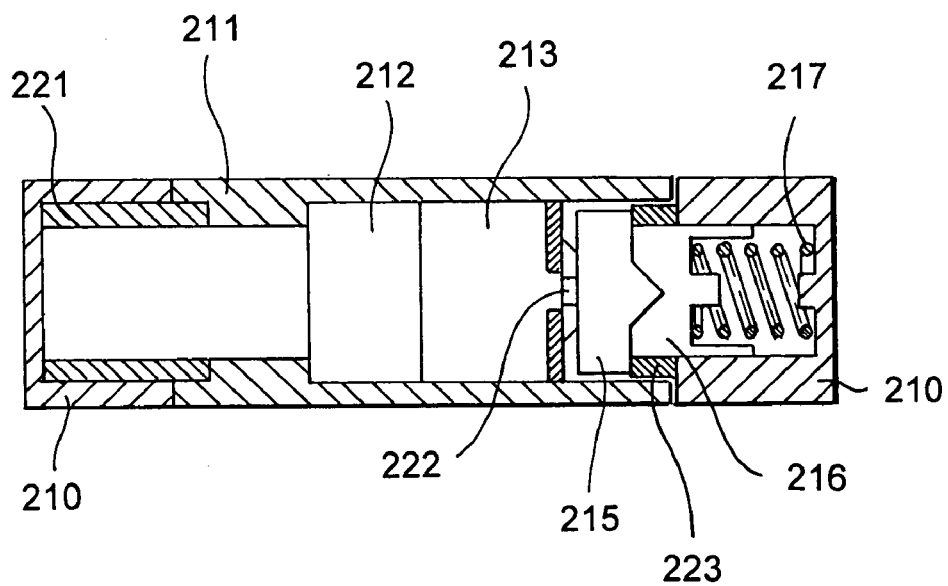

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 5:
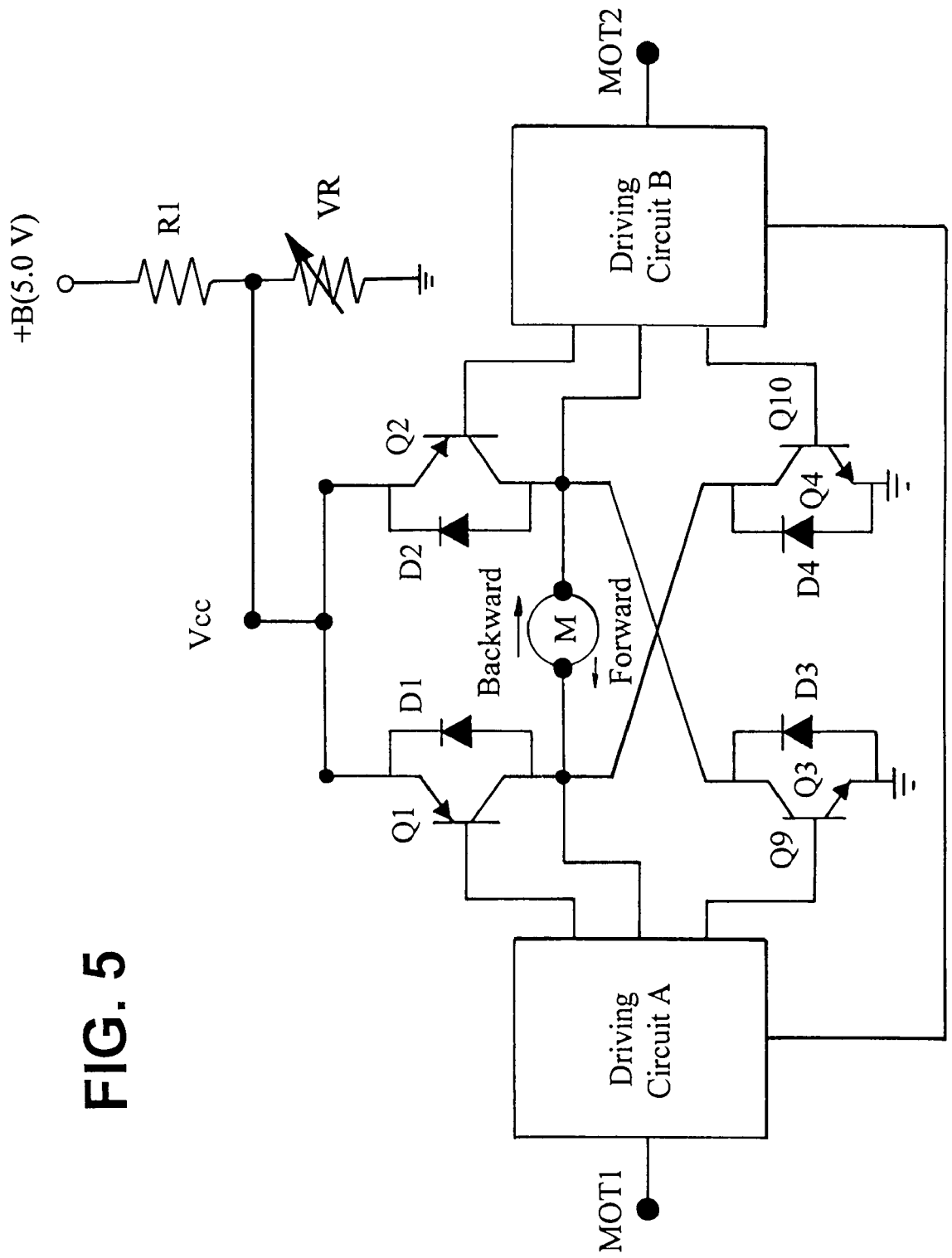
FIG. 5 is an exemplary view explaining technical features of the present invention.

Basically, the technical basis of the present invention lies in the characteristic of a DC motor that if an applied voltage increases, a revolving torque and speed increases as well. Turning now to FIG. 5, the motor driving system of the auto-folder type cellular phone according to the present invention and its constitution are briefly explained below.

FIG. 5 is a circuit diagram for facilitating an action of a motor (M), i.e. forward revolution and backward (reverse) revolution, mounted in the auto-folder type cellular phone. As shown in the drawing, there are two types of driving circuits, A (DC_A) and B (DC_B), which revolve the DC motor (M) in the forward or backward direction.

In other words, responsive to the operation of the driving circuit A (DC_A) and the driving circuit B (DC_B), a transistor Q1 and a transistor Q3 are turned on, and a transistor Q2 and a transistor Q4 are turned off, whereby the motor (M) revolves forwardly. On the contrary, when the transistor Q1 and the transistor Q3 are turned on, and the transistor Q2 and the transistor Q4 are turned off, the motor (M) revolves backwardly.

The driving voltage of the motor (M) at this time is Vcc, which is obtained by dividing the typical 5V battery voltage called +B. In general, the battery voltage (+B) is divided by a fixed resistance R1 and a variable resistance VR mounted on outside of the motor driving IC. In a normal driving mode, the driving voltage is typically around 3V.

The bottom line is that the batter voltage can be divided by the fixed resistance R1 and the variable resistance VR, and a user can vary an opening and closing velocity of the folder by regulating the resistance value of the variable resistance VR whenever necessary.

Figure 6:
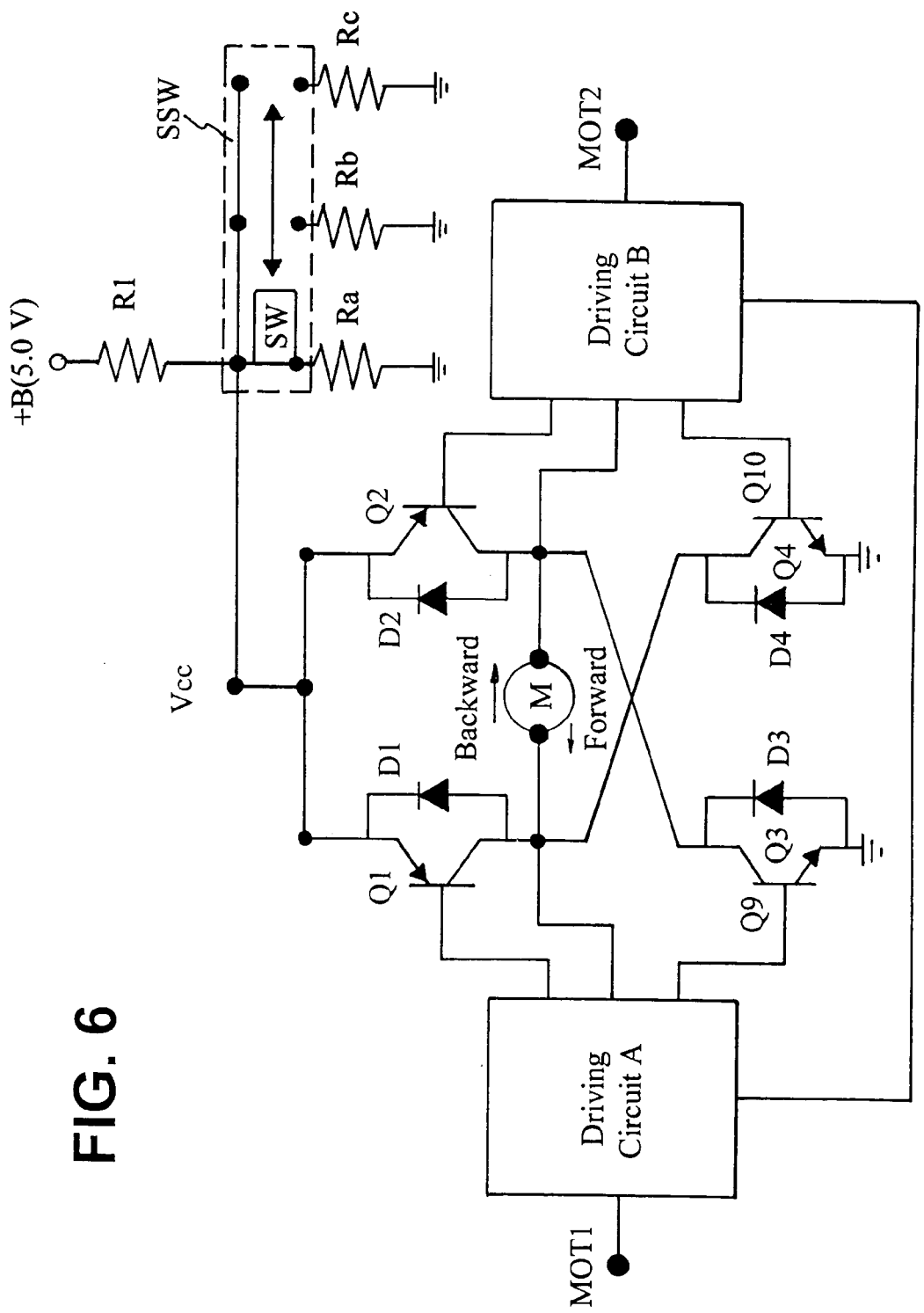
FIG. 6 is an exemplary view of a motor driven voltage regulating circuit according to an embodiment of the present invention.

FIG. 6 diagrammatically illustrates a more preferable circuit that is actually applied to the present invention. Unlike the circuit discussed in FIG. 5, there is provided a sliding switch SSW for selecting one of resistances from Ra through Rc.

For instance, suppose that the resistance value of the resistance Ra is the largest and the resistance value of the resistance Rc is the smallest. Also, suppose that when a user places a switch mounted on the sliding switch SSW in the center, that is, connecting the resistance R1 and the resistance Rb by way of dividing the battery voltage, a Vcc voltage remains unchanged from the previous voltage. In other words, the Vcc voltage in a standard situation is Rb=3/2·R1, or 3.0V.

However, when the user slides the switch SW mounted on the sliding switch SSW and thus connects the resistance R1 and the resistance Rc so as to divide the battery voltage, the Vcc voltage, which is dependent on the resistance value of Rc, is supposedly smaller than 3.0V (i.e. Rc=27/20·R1, or 2.7V), meaning the opening and closing velocity for the folder is decreased.

Meanwhile, when the user slides the switch SW mounted on the sliding switch SSW and thus connects the resistance R1 and the resistance Ra so as to divide the battery voltage, the Vcc voltage, which is dependent on the resistance value Ra this time, is supposedly greater than 3.0V (i.e. Ra=33/20·R1, or 3.3V), meaning the opening and closing velocity for the folder is increased.

As more concrete data, provided in FIG. 7 is a measurement of different torques generated by the motor (M) given a voltage as the switch SW mounted on the sliding switch SSW slides in either direction.

Figure 8:
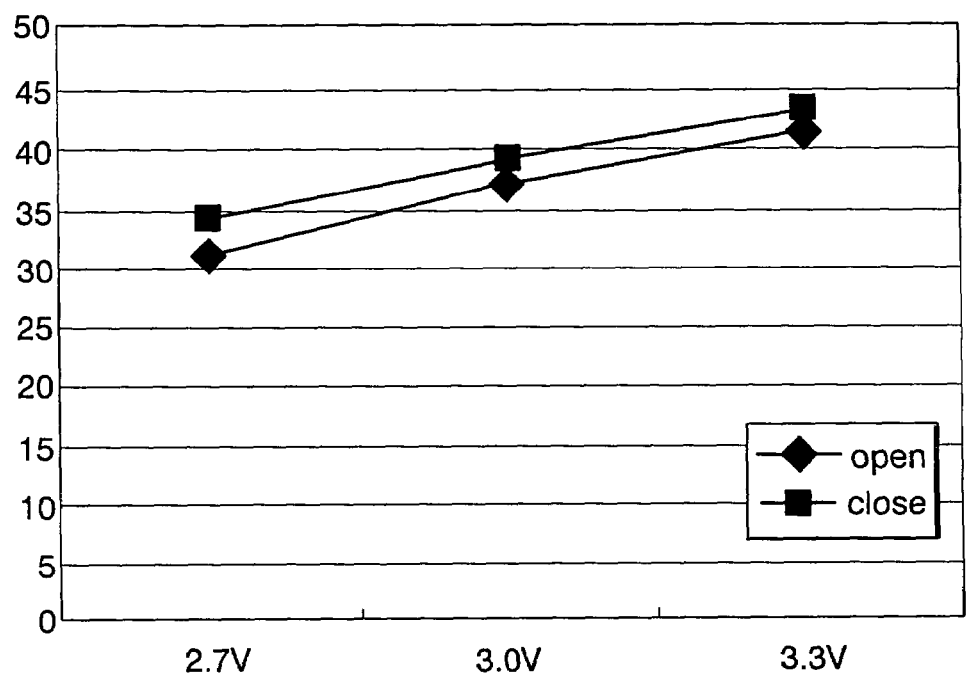
FIGS. 8 and 9 graphically exemplify the measurement of FIG. 7.
Figure 9:
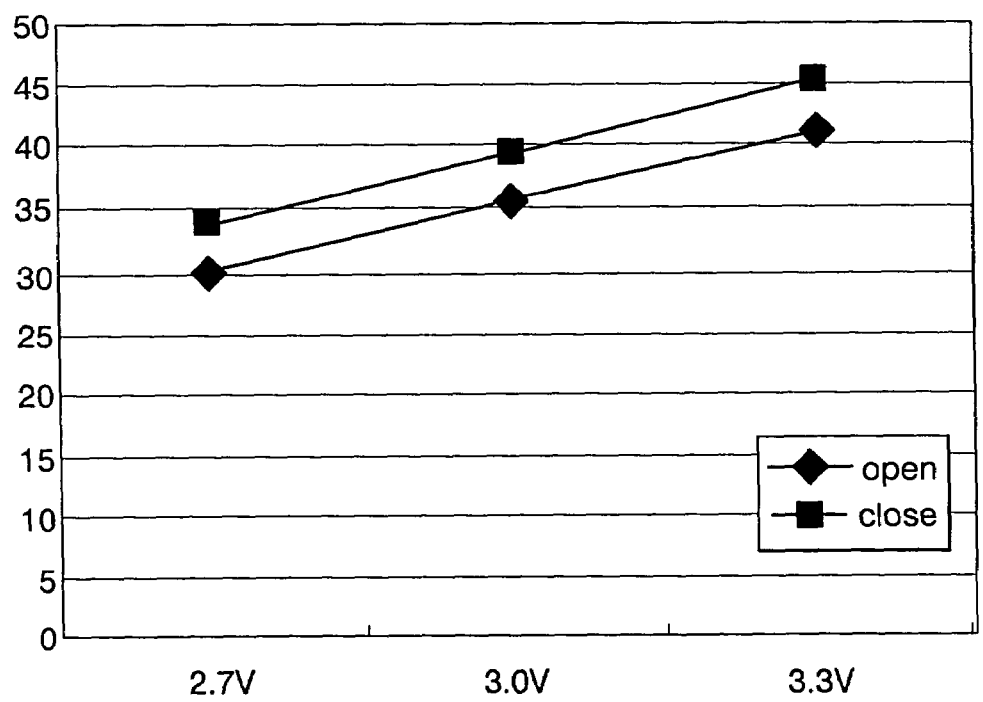

The measurement is then plotted in graphs as shown in FIGS. 8 and 9. For example, FIG. 8 illustrates a case of φ 8-module, and FIG. 9 illustrates a case of φ 9-module.

In conclusion, the auto-folder type cellular phone of the present invention can be very conveniently used for its subscribers because the subscribers can freely adjust or vary the opening and closing velocity of the folder to what they want, regardless of the predetermined opening and closing velocity of the folder.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An auto-folder type cellular phone with a variable opening and closing velocity, comprising:
   a main body with a pair of hinge shafts at one side, two hinge shafts being opened to face each other at a predetermined distance;
   a folder disposed between the pair of hinge shafts, having a cylindrical housing whose both sides are opened;
   a first coupler and a second coupler for adjusting a position for the folder to be opened and a position for the folder to be closed;
   an elastic member for providing an elastic force to make the first coupler and the second coupler coupled closely to each other;
   a fixed resistance with a predetermined resistance value for receiving a battery voltage supplied from a battery;
   a plurality of voltage-dividing resistances for dividing the battery voltage given that the voltage-dividing resistances are connected to the fixed resistance;
   a sliding switch for connecting the voltage-dividing resistances respectively to the fixed resistance in series by making a sliding motion; and
   a motor driving unit for opening and closing the folder centering around the hinge shafts by varying a direction of a divided voltage of the battery voltage taken in the motor, wherein the divided voltage varies responsive to the sliding switch at an operation signal given by a subscriber of the auto-folder type cellular phone.

2. The auto-folder type cellular phone according to claim 1, wherein the plurality of voltage-dividing resistances comprises:
   a first resistance for maintaining a low opening and closing velocity for the folder;
   a second resistance for maintaining a high opening and closing velocity of the folder high; and
   a third resistance for maintaining a normal opening and closing velocity of the folder.

3. The auto-folder type cellular phone according to claim 1, wherein the first resistance among the plurality of voltage-dividing resistances, serving to maintain a low opening and closing velocity for the folder, has a value of $27/20$ of the fixed resistance.

4. The auto-folder type cellular phone according to claim 1, wherein first resistance among the plurality of voltage-dividing resistances, serving to maintain a high opening and closing velocity for the folder has a value of $33/20$ of the fixed resistance.

* * * * *